United States Patent [19]

Lawler

[11] Patent Number: 5,086,253

[45] Date of Patent: Feb. 4, 1992

[54] AUTOMATIC HEADLIGHT DIMMER APPARATUS

[76] Inventor: Louis N. Lawler, 29156 Gabilan St., Barstow, Calif. 92311

[21] Appl. No.: 597,502

[22] Filed: Oct. 15, 1990

[51] Int. Cl.⁵ .............................................. B60Q 1/14
[52] U.S. Cl. ........................................ 315/83; 315/82; 315/159; 307/10.8
[58] Field of Search .................. 315/82, 80, 83, 159, 315/154; 307/10.8

[56] References Cited

U.S. PATENT DOCUMENTS

| | | | |
|---|---|---|---|
| 2,853,651 | 9/1958 | Jacobs | 315/83 |
| 2,959,709 | 11/1960 | Vanaman et al. | 315/83 |
| 3,011,092 | 11/1961 | Deuth | 315/83 |
| 3,274,434 | 9/1966 | Miller | 315/159 X |
| 3,775,639 | 11/1973 | Woodward | 315/83 |
| 4,665,321 | 5/1987 | Chang et al. | 315/82 X |

Primary Examiner—Eugene R. LaRoche
Assistant Examiner—Do Hyun Yoo
Attorney, Agent, or Firm—Leon Gilden

[57] ABSTRACT

An apparatus within a vehicle including a plurality of high beams in electrical communication with an automatic circuit to direct voltage to each associated high beam, wherein a photo-transistor is arranged in parallel circuitry to a relay coil and resistor, with the junction transistor arranged to interface between the first and the second parallel circuit, including the photo-transistor and adjustable resistor respectively. A modified detector circuit includes a second resistor in series with the resistor, and a third resistor in parallel relationship to the relay coil to effect a time delay in actuation of the high beam members of the vehicle. A third junction transistor is arranged in a third circuit parallel to the first and second circuit to direct current to the respective high beam for increased sensitivity relative to the incoming light source from a remote vehicle.

1 Claim, 3 Drawing Sheets

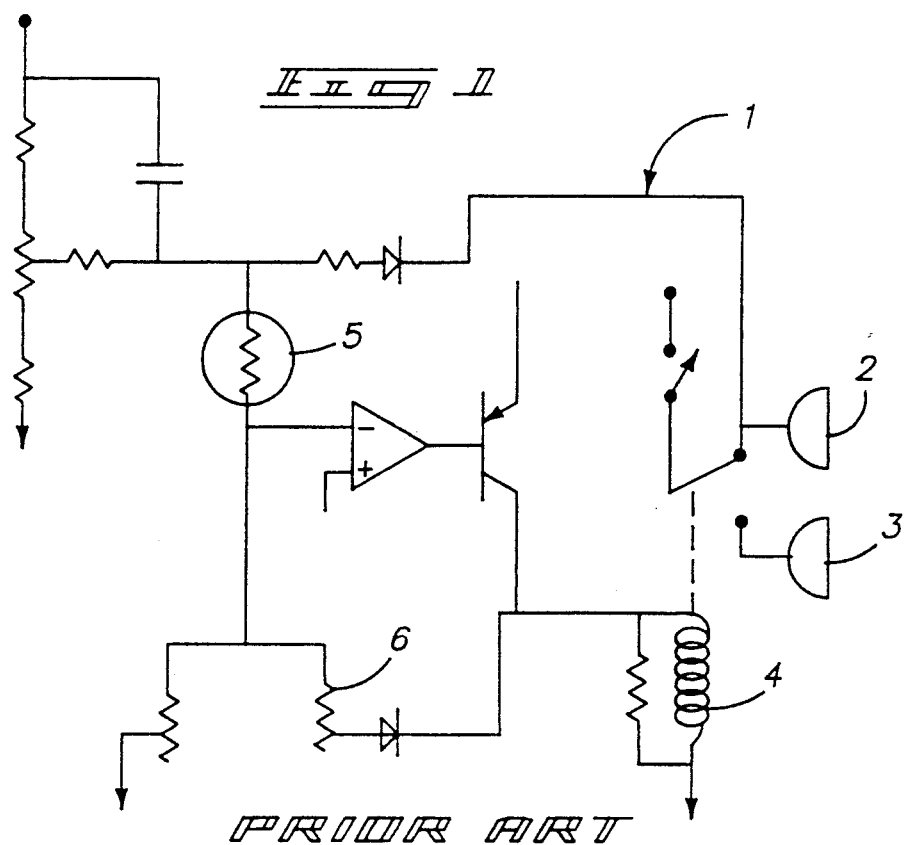
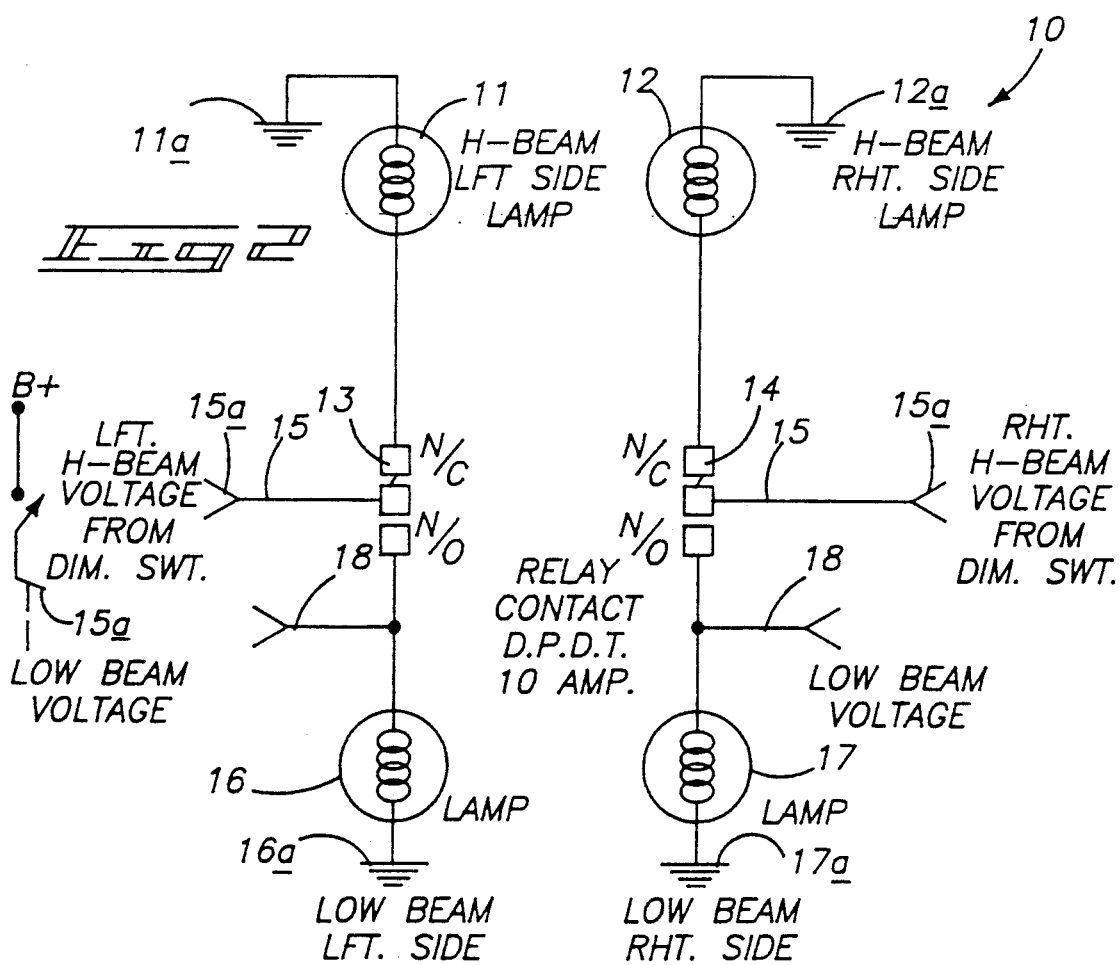

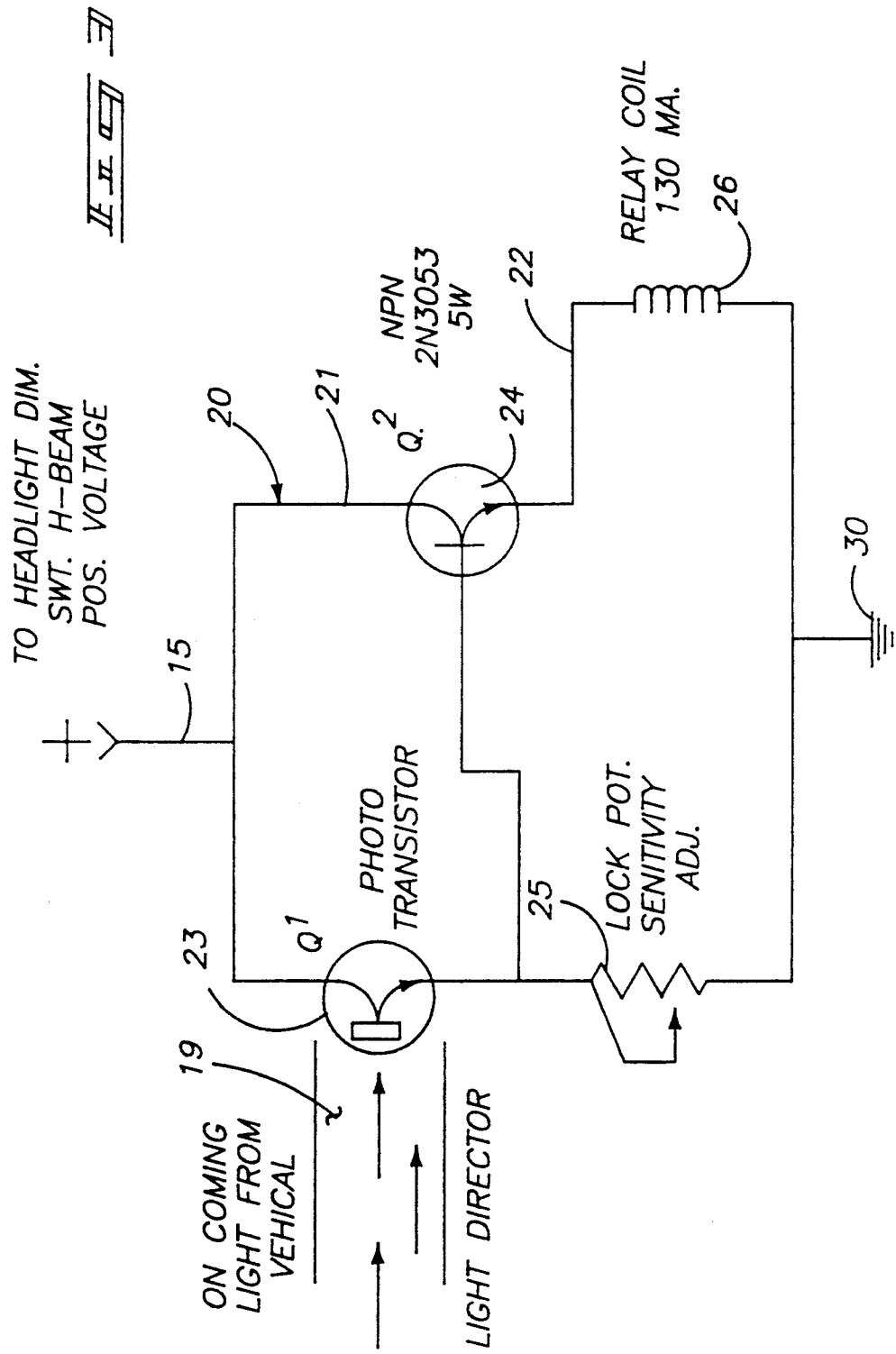

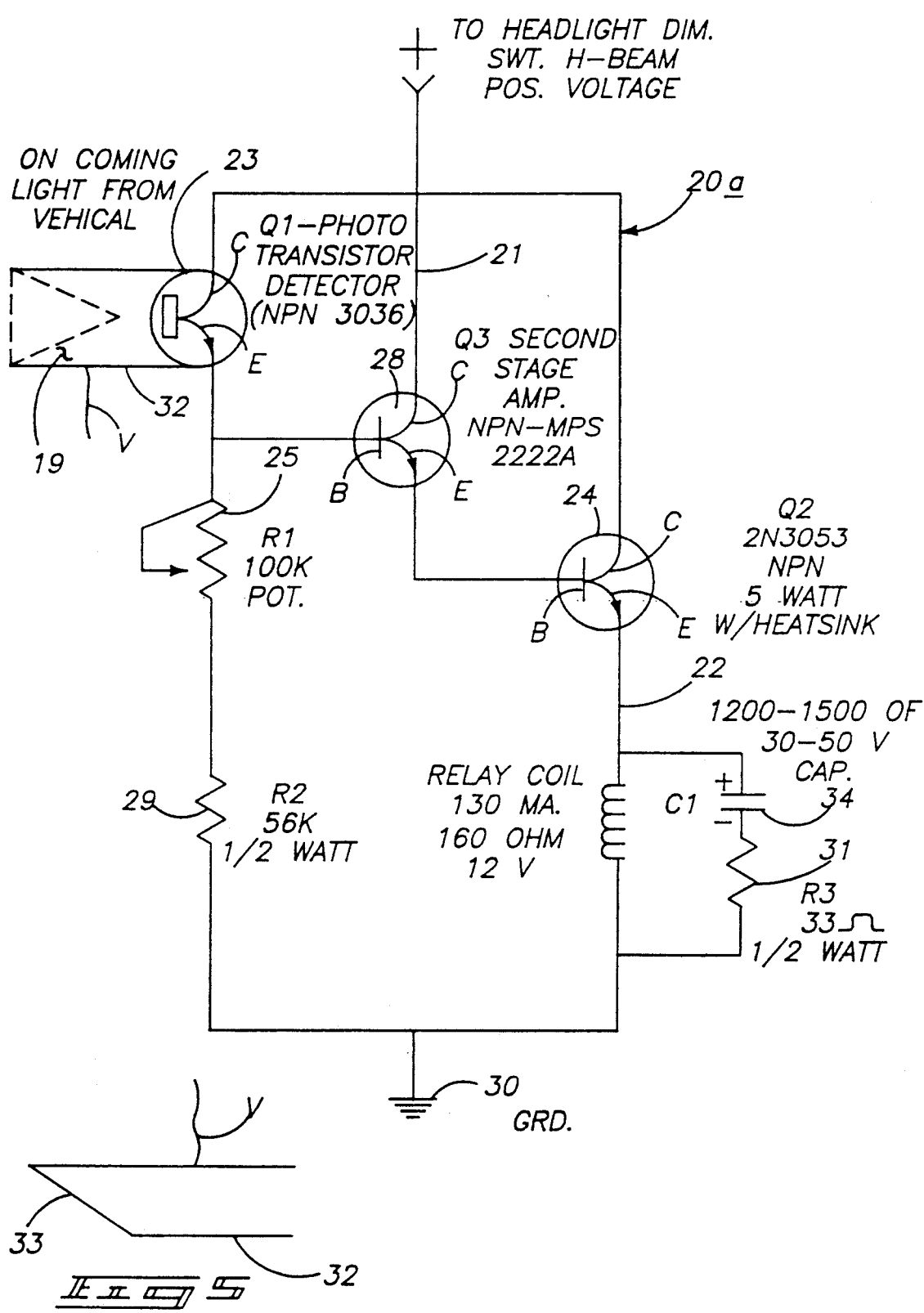

AUTOMATIC HEADLIGHT DIMMER APPARATUS

BACKGROUND OF THE INVENTION

1. Field of the Invention

The field of invention relates to dimmer circuitry utilized for automobiles, and more particularly pertains to a new and improved automatic light dimmer apparatus wherein the same is sensitive to oncoming vehicle headlights, and is in electrical communication with an automatic circuit to direct voltage.

2. Description of the Prior Art

Dimmer switch apparatus has been utilized in the prior art to effect dimming of automotive headlights in response to an oncoming vehicle. The requirement for such dimming to sense incoming light from an incoming vehicle produces the need for driver control, whereas the automatic feature of the instant invention, as well as prior art, is set forth in an effort to eliminate driver error. Prior art patents set forth in this regard may be found in U.S. Pat. Nos. 4,727,290; 3,177,397; 3,319,116; 3,381,169; and 3,423,633.

As such, it may be appreciated that there continues to be a need for a new and improved automatic headlight dimmer switch as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of vehicular headlight dimmer circuitry now present in the prior art, the present invention provides an automatic headlight dimmer switch wherein the same sets forth an automatic dimmer organization in response to incoming light. As such, the general purpose of the present invention, which will be described subsequently in greater detail, is to provide a new and improved automatic headlight dimmer switch which has all the advantages of the prior art vehicular headlight dimmer circuitry and none of the disadvantages.

To attain this, the present invention provides an apparatus wherein a plurality of high beams are in electrical communication with an automatic circuit to direct voltage to each associated high beam, wherein a photo-transistor is arranged in parallel circuitry to a relay coil and resistor, with the junction transistor arranged to interface between the first and the second parallel circuit, including the photo-transistor and adjustable resistor respectively. A modified detector circuit includes a second resistor in series with the resistor, and a third resistor in parallel relationship to the relay coil to effect a time delay in actuation of the high beam members of the vehicle. A third junction transistor is arranged in a third circuit parallel to the first and second circuit to direct current to the respective high beams for increased sensitivity relative to the incoming light source from a remote vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automatic headlight dimmer switch which has all the advantages of the prior art vehicular headlight dimmer circuitry and none of the disadvantages.

It is another object of the present invention to provide a new and improved automatic headlight dimmer switch which may be easily and efficiently manufactured and marketed.

It is a further object of the present invention to provide a new and improved automatic headlight dimmer switch which is of a durable and reliable construction.

An even further object of the present invention is to provide a new and improved automatic headlight dimmer switch which is susceptible of a low cost of manufacture with regard to both materials and labor, and which accordingly is then susceptible of low prices of sale to the consuming public, thereby making such automatic headlight dimmer switches economically available to the buying public.

Still yet another object of the present invention is to provide a new and improved automatic headlight dimmer switch which provides in the apparatuses and methods of the prior art some of the advantages thereof, while simultaneously overcoming some of the disadvantages normally associated therewith.

Still another object of the present invention is to provide a new and improved automatic headlight dimmer switch wherein the same provides for dimming of a vehicular headlight structure in response to incoming light from a further motor vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic illustration of a prior art headlight dimmer circuit.

FIG. 2 is a diagrammatic illustration of the instant invention.

FIG. 3 is a diagrammatic illustration of the detector circuit utilized by the instant invention.

FIG. 4 is a diagrammatic illustration of a modified detector circuit utilized by the instant invention.

FIG. 5 is a diagrammatic illustration of the beveled directional tube of the invention relative to its association with a vehicle "V".

DESCRIPTION OF THE PREFERRED EMBODIMENT

With reference now to the drawings, and in particular to FIGS. 1 to 5 thereof, a new and improved automatic headlight dimmer switch embodying the principles and concepts of the present invention and generally designated by the reference numeral 10 will be described.

FIG. 1 illustrates a prior art headlight dimmer apparatus 1, wherein a first and second headlight structure 2 and 3 cooperate with an activating coil 4 through a light sensitive resistance 5 cooperating with a variable resistance 6, in a manner as set forth in U.S. Pat. No. 4,727,290.

More specifically, the automatic headlight dimmer switch 10 of the instant invention essentially comprises a left hand and right hand respective high beam head lamp 11 and 12, each including a respective left and right hand ground 11a and 12a coupled through a respective left hand normally closed first switch 13 and a right hand normally closed first switch 14 to direct current through a high beam voltage input 15 into the high beam lamps. A respective left and right hand low beam lamp 16 and 17, each with a respective left and right hand low beam ground 16a and 17a, are provided independent current through a low beam voltage input 18.

Current to the high beam lamp voltage input 15 is directed from a detector circuit 20 (see FIG. 3) to effect voltage from an associated relay coil operative through a switch 15a, in a manner as set forth in U.S. Pat. No. 4,727,290, completing electrical continuity to the high beam circuit incorporated herein by reference. The detector circuit 20 includes a first detector circuit loop 21 parallel to a second detector circuit loop 22. A photo-sensitive transmitter 23 receives directional light from a light directional tube 32 that includes a beveled forward input end 33 (see FIG. 5) that is oriented towards a left hand side of a vehicle "V" on which it is mounted to ensure that a passing vehicle light prevents directing of current to the high beam voltage input 15 until complete passage of an oncoming vehicle has been completed to permit voltage to be directed to the voltage input 15. A photo-sensitive transistor 23 is provided in the first detector circuit loop 21 and is coupled to the second circuit 22 through a first junction transistor 24, which includes an adjustable potentiometer resistor 25 operative to effect actuation of a relay coil 26. A ground lead 30 is provided in the second circuit, as illustrated. Elimination of incoming light from an incoming light source 19 directs voltage to the high beam portions through the switch organization 15a accordingly. The modified detector circuit 20a, as illustrated in FIG. 4, includes a third detector circuit loop 27 parallel to the first and second circuit loops 21 and 22 that incorporates a second junction transistor 28 interfacing between the first, second, and third circuit loops 21, 22, and 27 respectively. A second resistor 29 is arranged in series with the potentiometer resistor 25 and is adjustable, in a manner as illustrated, with a third resistor 31 arranged parallel relative to the relay coil 26 and operative through a capacitor 34 that is arranged in series with the third resistor 31 to effect a time delay of generally one second to permit an oncoming vehicle to effect complete passage before re-energizing of the high beam lamps 11 and 12. As noted, each transistor includes a base "B" operative through a collector "C" and emitter "E", as noted in FIG. 4.

The photo-sensitive transistor 23 generally utilizes a photo-transistor detector NPN 3036, while the first junction transistor 24 is designated as a 2N 3053 NPN, with a five watt emitter and heat sink. The potentiometer resistor is adjustable and is of one hundred K potential, the second resistor 29 is of a fifty-six K half watt classification, the relay coil is of a 130 MA, 160 Ohm twelve volt classification, the third resistor 31 is of a 33 Ohm, half watt classification, with the capacitor 34 of a twelve to fifteen hundred UF30-50 volt classification.

The manner of usage and operation of the instant invention should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automatic headlight dimmer switch comprising, in combination,
    a light directional tube mounted to a vehicle, the directional tube including a beveled left side to permit light into the directional tube from an oncoming vehicle, and the directional tube including a photo-sensitive transistor mounted within the tube, the photo-sensitive transistor arranged in a first circuit loop parallel to a second circuit loop, the second circuit loop including a first adjustable potentiometer resistor in series with a relay coil, and
    a first junction transistor coupled between the first circuit loop and the second circuit loop, and a high beam voltage input line coupled to at least one high beam lamp mounted within the vehicle, and operative to direct voltage to the high beam lamp upon absence of light directed into the light directional tube upon actuation of the relay coil, and a third circuit loop arranged parallel to the first and second circuit loop, with the third circuit loop including a second junction transistor at a junction between the first, second, and third circuit loops, and a second resistor in series with the first adjustable resistor, and a third resistor in parallel with the relay coil, and a capacitor in series with the third resistor to effect a time delay in actuation of the relay coil to permit complete passage of the oncoming vehicle.

* * * * *